United States Patent
Ahn et al.

(10) Patent No.: US 8,660,376 B2
(45) Date of Patent: Feb. 25, 2014

(54) APPARATUS AND METHOD FOR DATA PROCESSING BASED ON VERTEX GROUPING

(75) Inventors: Min Su Ahn, Seoul (KR); Do Kyoon Kim, Seongnam-si (KR); Tae Hyun Rhee, Yongin-si (KR); Chang Su Kim, Seoul (KR); Jae Kyun Ahn, Seoul (KR); Dae Youn Lee, Seoul (KR)

(73) Assignees: Samsung Electronics Co., Ltd., Suwon-Si (KR); Korea University Industrial & Academic Collaboration Foundation, Seoul (KR)

( * ) Notice: Subject to any disclaimer, the term of this patent is extended or adjusted under 35 U.S.C. 154(b) by 93 days.

(21) Appl. No.: 13/354,056

(22) Filed: Jan. 19, 2012

(65) Prior Publication Data

US 2012/0189220 A1 Jul. 26, 2012

(30) Foreign Application Priority Data

Jan. 21, 2011 (KR) ........................ 10-2011-0006468

(51) Int. Cl.
*G06K 9/36* (2006.01)
(52) U.S. Cl.
USPC ........................................................ 382/238
(58) Field of Classification Search
None
See application file for complete search history.

(56) References Cited

U.S. PATENT DOCUMENTS

| | | | | |
|---|---|---|---|---|
| 6,049,400 | A * | 4/2000 | Vondran, Jr. | 358/525 |
| 6,167,159 | A * | 12/2000 | Touma et al. | 382/242 |
| 6,262,737 | B1 * | 7/2001 | Li et al. | 345/419 |
| 6,373,491 | B1 * | 4/2002 | Sasaki | 345/443 |
| 6,782,335 | B1 * | 8/2004 | Lynaugh et al. | 702/107 |
| 2002/0005856 | A1 * | 1/2002 | Sasaki | 345/606 |
| 2005/0280832 | A1 * | 12/2005 | Johnson et al. | 356/625 |
| 2010/0026684 | A1 * | 2/2010 | Hasselgren et al. | 345/426 |
| 2011/0285708 | A1 * | 11/2011 | Chen et al. | 345/420 |

FOREIGN PATENT DOCUMENTS

| | | | |
|---|---|---|---|
| EP | 2216750 A1 * | 8/2010 | G06T 9/00 |
| JP | 2002-501650 | 1/2002 | |
| JP | 2003-091742 | 3/2003 | |
| JP | 2007-233560 | 9/2007 | |
| KR | 10-2000-0028583 | 5/2000 | |
| KR | 10-2001-0008944 | 2/2001 | |
| KR | 10-2003-0050308 | 6/2003 | |
| KR | 10-2004-0096209 | 11/2004 | |
| KR | 10-2008-0051018 | 6/2008 | |
| KR | 10-2009-0065352 | 6/2009 | |
| KR | 10-2009-0110776 | 10/2009 | |

OTHER PUBLICATIONS

Mathworks, chapter 3—Interpolation, http://www.mathworks.com/moler/interp.pdf, published in 2008.*
Teunissen, "On a stronger-than-best property for best prediction" Journal of Geodesy, Mar. 2008, vol. 82, No. 3, pp. 167-175.*
Li et al., "Progressive Compression of 3D Graphic Models", IEEE Proceedings of Multimedia Computing and Systems, 1997, pp. 135-142.*

* cited by examiner

*Primary Examiner* — Bhavesh Mehta
*Assistant Examiner* — Feng Niu
(74) *Attorney, Agent, or Firm* — Staas & Halsey LLP

(57) ABSTRACT

A data processing apparatus and method. A vertex grouping unit of the data processing apparatus may group, into at least one group, a plurality of vertices included in a three-dimensional (3D) object desired to be compressed. A prediction mode determination unit may determine a prediction mode for compressing a vertex position with respect to each of the at least one group. A coder may code a prediction error vector and an identification (ID) index of the prediction mode determined with respect to each of the at least one group.

20 Claims, 6 Drawing Sheets

200

300

APPARATUS AND METHOD FOR DATA PROCESSING BASED ON VERTEX GROUPING

CROSS-REFERENCE TO RELATED APPLICATIONS

This application claims the priority benefit of Korean Patent Application No. 10-2011-0006468, filed on Jan. 21, 2011, in the Korean Intellectual Property Office, the disclosure of which is incorporated herein by reference.

BACKGROUND

1. Field

Example embodiments of the following description relate to a data processing apparatus and method that may compress geometry information associated with an object of a three-dimensional (3D) model, and more particularly, to a data processing apparatus and method for data compression and position prediction of a 3D object.

2. Description of the Related Art

Currently, a three-dimensional (3D) object or 3D scene data has been applied in many application fields, for example, a game, a digital movie, a computer-aided design (CAD), and the like. With development of technology, a desire for sensory rendering is also increasing and a general 3D model may include thousands of surfaces, or even millions of surfaces. Accordingly, technology for effectively compressing a 3D object may be used for effective transmission or storage with a limited transmission bandwidth or storage capacity.

A process of expressing a modeled 3D object may include a point-based process and a mesh-based process. In the mesh based process, being widely used, a mesh may include position information, for example, geometry information of a vertex and connection information between vertices.

A variety of publications and patents are disclosed to compress position information of a mesh and connection information between meshes. However, existing processes have generally focused on compression of connection information instead of position information, for example, geometry information.

However, since an amount of data of the position information is greater than an amount of data of the connection information, decreasing of the geometry information may effectively enhance the whole compression efficiency.

Existing methods for compressing position information, for example, the geometry information, may predict a position of a vertex desired to be compressed or be decompressed by simply using vertices processed during a compression process or a decompression process.

SUMMARY

According to an aspect of one or more embodiments, there is provided a data processing apparatus, including a vertex grouping unit to group, into at least one group, a plurality of vertices included in a three-dimensional (3D) object; a prediction mode determination unit to determine a prediction mode for compressing a vertex position with respect to each of the at least one group; and a coder to code a prediction error vector and an identification (ID) index of the prediction mode determined with respect to each of the at least one group.

The vertex grouping unit may group, into the at least one group, the plurality of vertices included in the 3D object so that a number of vertices less than or equal to a first threshold may be included in a single group.

The data processing apparatus may further include a preprocessor to simplify a mesh included in the 3D object by decimating at least a portion from the plurality of vertices included in the 3D object.

For a first vertex included in a first group of the at least one group, the prediction mode determination unit may determine a prediction mode for predicting a position of the first vertex, based on a curvature that is calculated using at least one direct connection vertex directly connected to the first vertex, and at least one vertex directly connected to the at least one direct connection vertex.

For whole vertices included in the first group, the prediction mode determination unit may determine a prediction mode to be applied to the first group so that a prediction error may be minimized compared to a data size.

The prediction mode determination unit may determine the prediction mode by applying one of a 2-ring prediction process and a minimum mean square error (MMSE) prediction process.

The coder may include an arithmetic coder to perform entropy coding of the ID index of the prediction mode determined with respect to each of the at least one group; and a bit-plane coder to perform entropy coding of the prediction error vector.

According to another aspect of one or more embodiments, there is provided a data processing method, including grouping, into at least one group, a plurality of vertices included in a 3D object; determining a prediction mode for compressing a vertex position with respect to each of the at least one group; and coding a prediction error vector and an ID index of the prediction mode determined with respect to each of the at least one group.

According to one or more embodiments, there may be provided a data processing apparatus and method that may effectively compress position information of a vertex.

According to one or more embodiments, there may be provided a prediction method and a mode determination method that may be suitable for progressive transmission and be applicable to a mesh of a static 3D object, as well as a mesh of a dynamic 3D object.

According to one or more embodiments, there may be provided a data processing apparatus and method that may provide a relatively excellent prediction accuracy compared to a size of data with a small increase in the size of data by grouping the whole vertices into a plurality of groups and by determining a vertex position prediction mode with respect to each of the groups.

According to one or more embodiments, there may be provided a system for processing data representing a three-dimensional (3D) object, the system including a preprocessor to simplify the 3D object to be compressed using a mesh simplification process; a vertex grouping unit to group a plurality of vertices into one or more groups; a prediction mode determination unit to determine a prediction mode most suitable for each of the one or more groups, and to apply the determined prediction mode to each vertex of the plurality of vertices included in a respective group; and a coder to code a prediction error vector and an identification (ID) index of the determined prediction mode with respect to each of the one or more groups.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
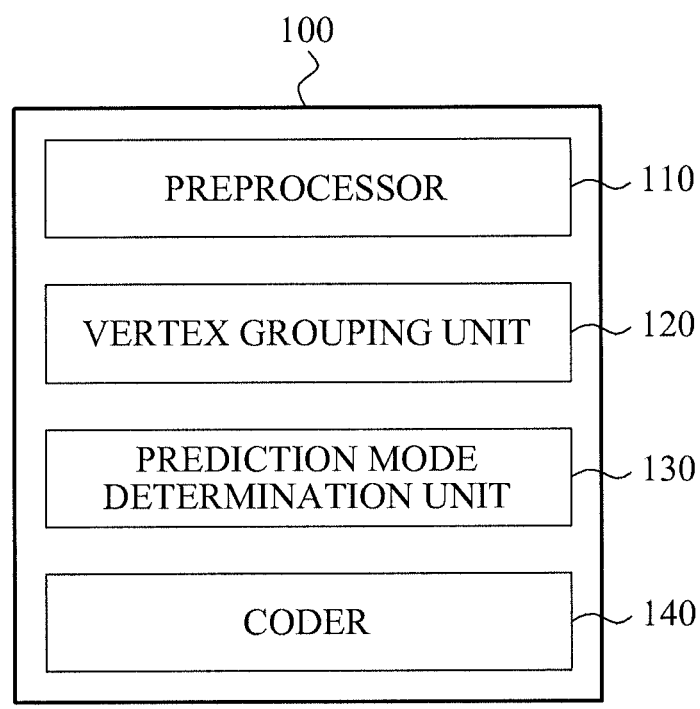
FIG. 1 illustrates a data processing apparatus according to one or more embodiments.

Reference will now be made in detail to embodiments, examples of which are illustrated in the accompanying drawings, wherein like reference numerals refer to the like elements throughout. Embodiments are described below to explain the present disclosure by referring to the figures.

FIG. 1 illustrates a data processing apparatus 100 according to one or more embodiments.

Referring to FIG. 1, the data processing apparatus 100 may include a preprocessor 110 to simplify a three-dimensional (3D) object using a mesh simplification process, a vertex grouping unit 120 to group, into a plurality of groups, a plurality of vertices included in the 3D object, a prediction mode determination unit 130 to determine, with respect to each of the groups, a prediction mode having a smallest vertex position prediction error compared to a data size, and a coder 140 to perform entropy coding of vertices included in each of the groups based on the determined prediction mode.

The preprocessor 110 may simplify the 3D object to be compressed using the mesh simplification process.

The above simplification process may correspond to a process of dividing a plurality of meshes constituting the 3D object into a base mesh that is the 3D object in a simple form and information used to restore the original shape.

Among a variety of mesh simplification methods, description explicitly understandable to those skilled in the art may still fall within the range of the present disclosure without departing from the spirits thereof.

Information used to restore a simplified mesh to be the same as an original mesh may include position information, for example, geometry information of decimated vertices and connection information indicating a connection relationship between vertices.

According to an embodiment, the data processing apparatus 100 may be associated with a prediction mode determination process of accurately performing an original restoration after a coding and decoding process by determining a prediction mode capable of effectively predicting vertex position information, without significantly increasing a data size.

When the same prediction mode is applied with respect to all of the vertices, a prediction accuracy compared to a data size may be relatively high with respect to a portion of the vertices and may be relatively low with respect to another portion of the vertices.

When a prediction mode most suitable for each vertex is determined, and the determined prediction mode is applied to a corresponding vertex, a significant amount of data may be used for indexing an identification (ID) of the prediction mode, thereby decreasing the efficiency of compressing a vertex position.

According to an embodiment, the vertex grouping unit 120 may group, into at least one group, the plurality of vertices constituting the 3D object.

When a predetermined vertex is to be added, the vertex grouping unit 120 may determine whether a group is to be divided so that a number of vertices greater than a first threshold may not be included in a single group.

For example, when an initial simple mesh is given, all the vertices may be determined to belong to the same group. When a number of vertices belonging to a single group exceeds the first threshold, according to an addition of a decimated vertex, a single region may be divided into two regions.

For example, when the first threshold=1000, and when the $1001^{st}$ vertex is added, the vertex grouping unit 120 may divide an existing group into at least two groups. Since the above process is automatically performed according to a method pre-designated in a vertex compression and decompression process, a size of data for information of designation or division of a group may not significantly increase.

According to embodiments, when generating a division group, vertex grouping may be uniformly performed using a predetermined method based on only connection information between vertices. Accordingly, additional information, for example, which vertex belongs to which division group, a total number of division groups, and the like, may not be stored or compressed.

Accordingly, when a total number of vertices and a unique index of a predetermined vertex are given, a total number of vertex groups and a group including the predetermined vertex may be readily determined.

The prediction mode determination unit 130 of the data processing apparatus 100 may determine a prediction mode most suitable for each of divided groups, using a prediction mode determination method described below, and may uniformly apply the same prediction mode to vertices included in the same group.

Accordingly, in the data processing apparatus 100 according to an embodiment, an increase in a data size used for indexing an ID of a prediction mode may be insignificant. Since an optimal prediction mode is applied for each group, the prediction accuracy may be relatively high compared to the data size.

The prediction mode determination unit 130 may determine the prediction mode with respect to each division group by applying a 2-ring prediction process, a minimum mean square error (MMSE) prediction process, and the like.

The prediction mode determination unit 130 may calculate a curvature from other vertices adjacent to a vertex of which a position is desired to be predicted, and may predict the position of the vertex based on the curvature.

The other adjacent vertices used in the above example may include a direct connection vertex that is directly connected to the vertex of which the position is desired to be predicted, that is, of which connection relationship is defined without using additional connection information with another vertex.

When calculating the curvature, vertices that are directly connected to the direct connection vertex, that is, vertices that are connected to the vertex of which the position is desired to be predicted via a single vertex, may be used.

Hereinafter, the 2-ring prediction process available by the prediction mode determination unit 130 will be described.

When $x_j$ denotes a position of a vertex j, a conventional average point prediction method may calculate $x_j$ according to Equation 1:

$$\hat{x}_j^B = u_j \doteq \frac{1}{v_j}\sum_{l \in N_j} x_l, \qquad \text{Equation 1}$$

In Equation 1, $N_j$ denotes a set of indices of vertices adjacent to the vertex j and $v_j$ denotes a number of vertices adjacent to the vertex j. In this example, vertices being adjacent to each other may indicate that the two vertices are directly connected to each other without an additional vertex between the two vertices.

In Equation 1, according to the conventional method, the average point prediction may be performed based on the assumption that a position of a vertex desired to be predicted is averagely similar to positions of vertices adjacent to the vertex.

According to an embodiment, the 2-ring prediction process may be applied by expanding the above assumption to vertices directly connected to direct connection vertices, in addition to the directly connected vertex j.

Using the above assumption, a new energy function with respect to a prediction error may be defined, as shown in Equation 2:

$$C(\hat{x}_j) = \|\hat{x}_j - u_j\|^2 + \alpha \sum_{l \in N_j} \|x_l - u_l\|^2 \qquad \text{Equation 2}$$

In Equation 2, α denotes a proportional constant, and thus, may be set to be different based on a feedback according to a prediction result or an application example. The 2-ring prediction minimizing Equation 2 about the energy function, that is, the energy function, may be calculated according to Equation 3:

$$\hat{x}_j^D = \underset{\hat{x}_j}{\operatorname{argmax}}\, C(\hat{x}_j) \qquad \text{Equation 3}$$

$$= \frac{1}{w}\left(u_j + \alpha \sum_{l \in N_j} \frac{1}{v_l^2}\left(v_l x_l - \sum_{k \in N_l, k \neq j} x_k\right)\right)$$

In Equation 3, $$w = 1 + \alpha \sum_{l \in N_j} \frac{1}{v_l^2}.$$

In Equation 3, the 2-ring prediction may include two terms.

A first term $u_j$ may be defined as a primary ring and a second term $$\sum_{l \in N_j} \frac{1}{v_l^2}\left(v_l x_l - \sum_{k \in N_l, k \neq j} x_k\right)$$

may be defined as a secondary ring.

In this instance, the meaning of the primary ring may indicate that two vertices are directly connected to each other. The meaning of the secondary ring may indicate that a single vertex is additionally used to define a connection relationship between two vertices.

In the case of the secondary ring, two vertices are not directly connected to each other and are commonly connected directly to a single predetermined vertex.

A prediction may be performed to minimize the energy function by a prediction about the primary ring and a prediction about the secondary ring.

The primary ring prediction is the same as the conventional average point prediction method, and the secondary ring prediction added according to an embodiment may be obtained from prediction about an average point of adjacent points.

As described above, even though the performance of when the proportional constant α=1 is greater than the average point prediction method, it is possible to generate prediction modes while adjusting α, and to combine the prediction modes with a following mode determination method in order to enhance a compression performance.

The prediction mode determination unit 130 may predict the prediction mode using an MMSE prediction.

In this example, the position $x_j$ of the vertex j may be predicted using the MMSE prediction. This prediction may be expressed by a linear prediction according to Equation 4:

$$\hat{x}_j^M = \sum_{k=0}^{n-1} w_{j,k} x_{j,k} \qquad \text{Equation 4}$$

In Equation 4, $w_{j,k}$ denotes a weight constant and $x_{j,k}$ denotes neighboring vertices having connection distances from the vertex j less than or equal to 2.

An MMSE may be defined by Equation 5:

$$E\{\|x_j - \hat{x}_j^M\|^2\} \qquad \text{Equation 5}$$

In this case, a weight minimizing Equation 5 may be calculated according to Equation 6:

$$w_j = R_j^{-1} C_j \qquad \text{Equation 6}$$

In Equation 6, (k,l) component of $R_j$ corresponds to $E\{x_{j,k}{}^t x_{j,l}\}$ and a $k^{th}$ component of $c_j$ corresponds to $E\{x_{j,k}{}^t x_j\}$. The above correlation may be approximated to a graph distance between points as expressed by Equation 7:

$$E\{x_{j,k}{}^t x_{j,l}\} = \rho^{d_{kl}} \sigma^2 \qquad \text{Equation 7}$$

The prediction mode determination unit 130 may apply, to vertices included in each group, a vertex position prediction process selected with respect to a corresponding group.

In this example, the prediction mode determination unit 130 may select a prediction process minimizing a square size of an error vector with respect to each division region.

In the case of a prediction mode application, when an index of the prediction process applied to a division region i is $m_i$, $m_i$ may be calculated according to Equation 8:

$$m_i = \underset{k}{\operatorname{argmin}} \sum_{j \in s_i} \|x_j - f_k(x_j)\|^2 \qquad \text{Equation 8}$$

In Equation 8, $f_k(x_j)$ denotes a predicted position with respect to the vertex j of when a vertex position prediction process k is employed.

The coder 140 may perform entropy coding of a prediction error vector and an index with respect to a prediction mode that is applied to vertices included in each division group, based on a prediction mode to be applied to a corresponding division group.

Even though not illustrated in figures, the coder 140 may include an arithmetic coder to perform entropy coding of the index of the vertex position prediction process applied to each division group, and a bit-plane coder to perform entropy coding of the prediction error vector.

Grouping of vertices, determining of a vertex position prediction mode with respect to each group, coding using the determined prediction mode, and the like, are described above. Hereinafter, each process will be further described with reference to FIG. 2 through FIG. 5.

Figure 2:
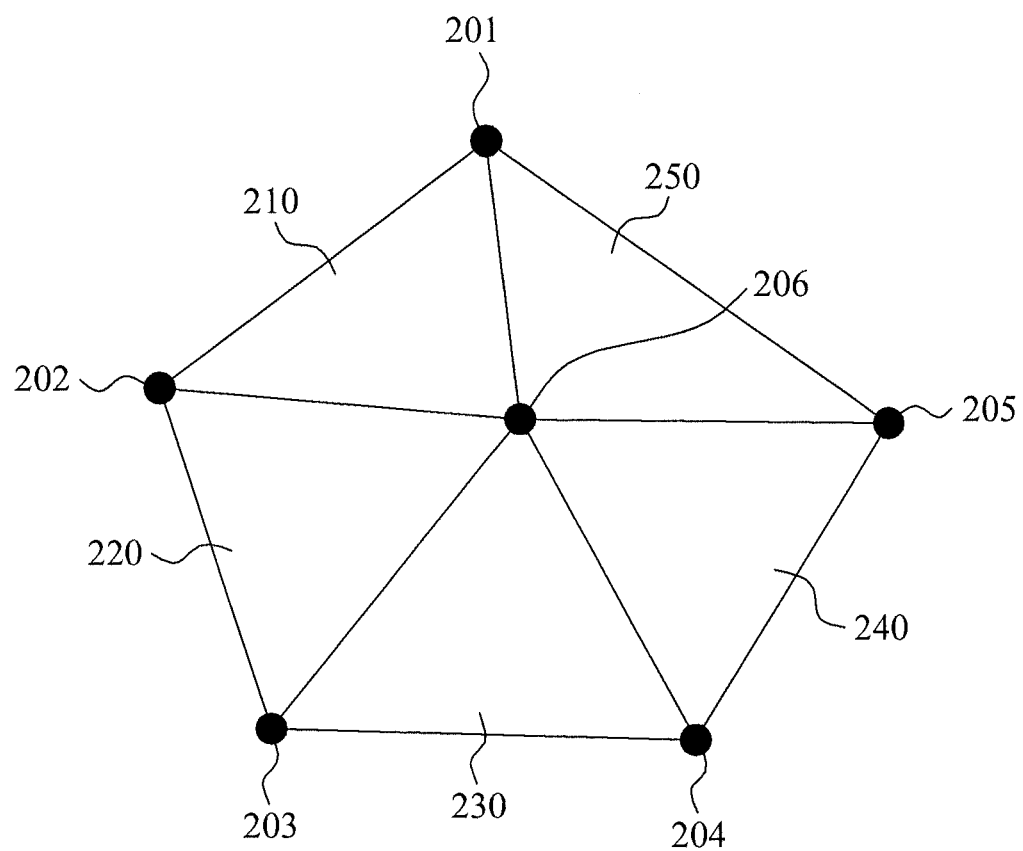
FIG. 2 illustrates a diagram of exemplary meshes to describe a process of determining a prediction mode using a data processing method according to one or more embodiments.

FIG. 2 illustrates a diagram 200 of exemplary meshes 210, 220, 230, 240, and 250 to describe a process of determining a prediction mode using a data processing method according to one or more embodiments.

The exemplary meshes 210, 220, 230, 240, and 250 may be defined by positions of vertices 201, 202, 203, 204, 205, and 206, and connection information thereof.

When the preprocessor 110 simplifies the exemplary meshes 210, 220, 230, 240, and 250, a portion of the vertices 201, 202, 203, 204, 205, and 206 may be decimated. For example, the vertex 206 may be decimated, and information for restoration of the decimated vertex 206 may be separately stored.

Prediction modes to predict connection information or a position of a decimated vertex after the above mesh simplification process may be selected and coded.

Figure 3:
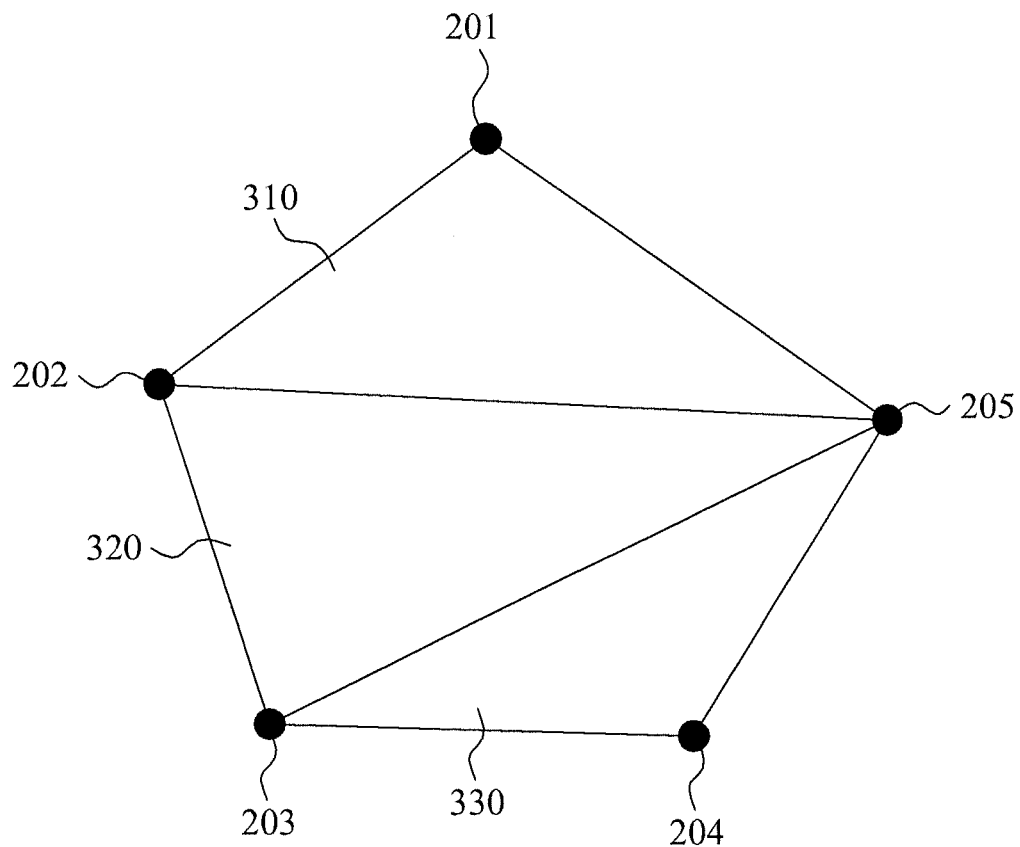
FIG. 3 illustrates a diagram of a process of simplifying a mesh by decimating a vertex in a mesh of FIG. 2 using a data processing method according to one or more embodiments.

FIG. 3 illustrates a diagram 300 of a process of simplifying a mesh by decimating a vertex in a mesh of FIG. 2 using a data processing method according to one or more embodiments.

Referring to FIG. 3, the vertex 206 of FIG. 2 is decimated. As a result, the number of meshes is reduced from four to three. In FIG. 3, three meshes 310, 320, and 330 are present.

When the above simplification process is repeated, a base mesh may remain. Decimated vertices may be restorable using position prediction information, connection relationship information, and the like.

Figure 4:
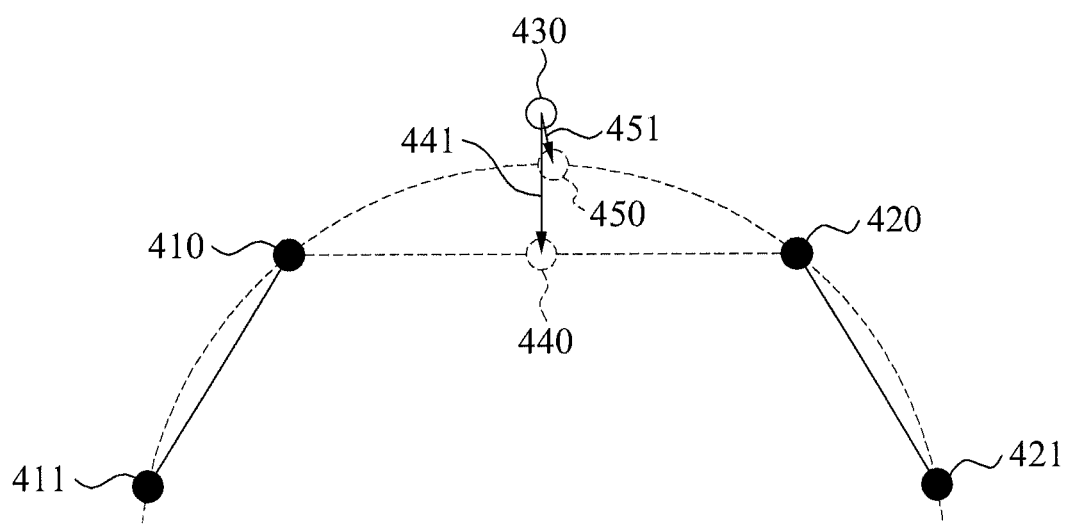
FIG. 4 illustrates a process of predicting a position of a vertex based on a curvature using a data processing method according to one or more embodiments.

FIG. 4 illustrates a process of predicting a position of a vertex based on a curvature using a data processing method according to one or more embodiments.

Referring to FIG. 4, vertices 410, 411, 420, and 421 may correspond to a before-decimation vertex or a processing complete vertex, and a vertex 430 may correspond to a vertex to be restored by prediction.

According to the conventional average position prediction method, a position of the vertex 430 may be expressed by an average position 440 of the vertices 410 and 420, corresponding to direct connection vertices and an error vector 441 between the vertex 430 corresponding to an actual vertex and the predicted average position 440.

In this example, the error vector 441 may be relatively large.

According to an embodiment, the position of the vertex 430 may be expressed by a position 450 and an error vector 451 that are predicted from curvature information of a curve indicated by a dotted line based on the direct connection vertices 410 and 420 and the vertices 411 and 421 directly connected thereto.

In this example, the error vector 451 may become smaller than the existing error vector 441. Accordingly, an increase with respect to a size of data may be insignificant whereas prediction accuracy may be significantly enhanced. The error vectors 441 and 451 may correspond to information that needs to be stored. Accordingly, when a size of an error vector decreases, a size of data to be stored may also decrease.

The above curvature based vertex position prediction is described above with reference to FIG. 1 and Equation 1 through Equation 8, and thus, further detailed description will be omitted here.

Figure 5:
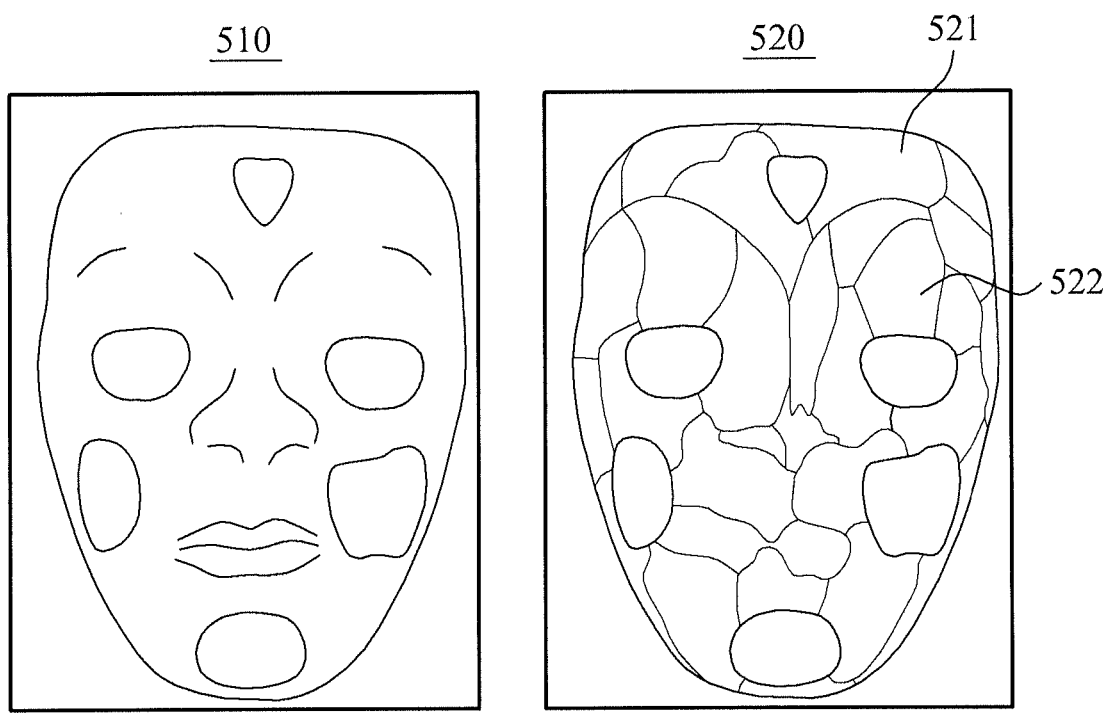
FIG. 5 illustrates a process of dividing a three-dimensional (3D) object into a plurality of groups, and determining a prediction mode for each of the groups using a data processing method according to one or more embodiments.

FIG. 5 illustrates a process of dividing a 3D object into a plurality of groups, and determining a prediction mode for each of the groups using a data processing method, according to one or more embodiments.

It may be assumed that an original 3D object 510 includes a large number of meshes and vertices. As described above, when the same prediction mode is applied to all of vertices, a size of data for prediction mode indexing may significantly increase whereby the efficiency may be deteriorated.

The vertex grouping unit 120 may group vertices into a plurality of groups including groups 521 and 522 included in a divided 3D object 520. A prediction mode determined by the prediction mode determination unit 130 may be applied to each of the groups.

Figure 6:
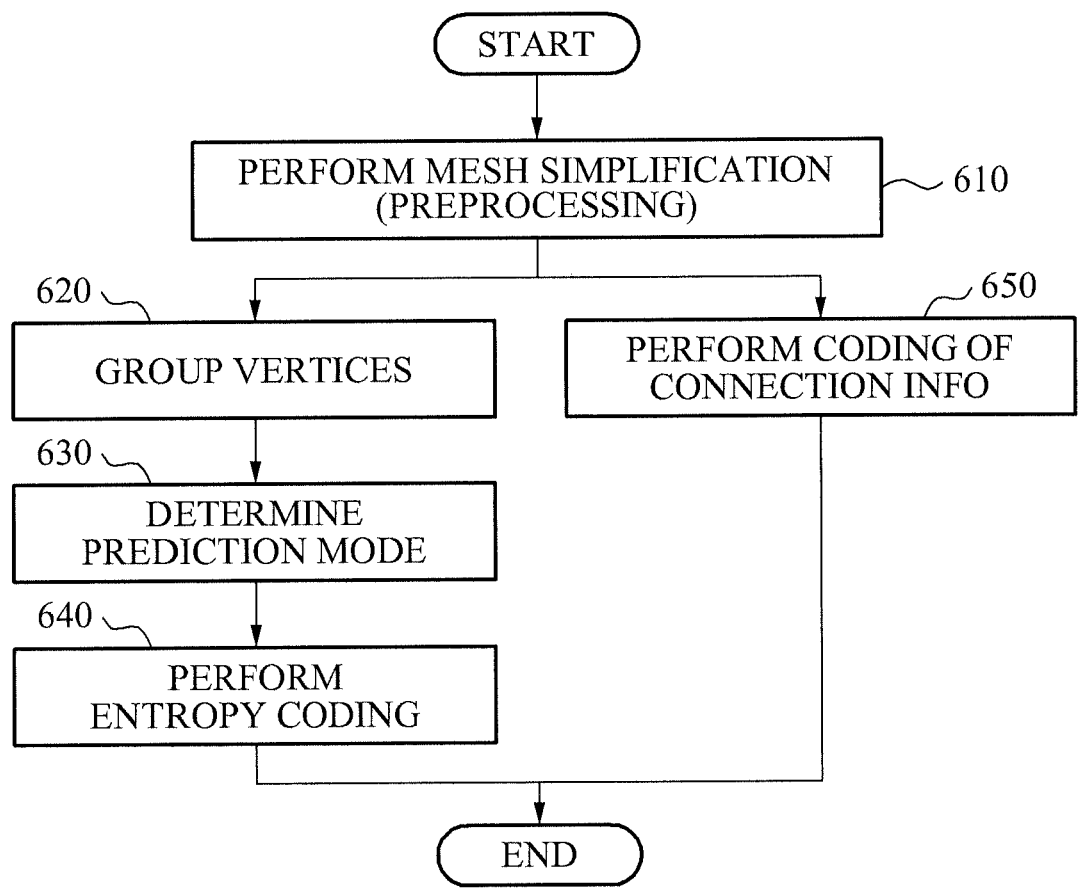
FIG. 6 illustrates a data processing method according to one or more embodiments.

FIG. 6 illustrates a data processing method, according to one or more embodiments.

In operation 610, the preprocessor 110 may perform a mesh simplification process with respect to a 3D object desired to be compressed.

The 3D object may be divided into a base mesh and information used for restoration of decimated vertices through the mesh simplification process.

The mesh simplification process is described above with reference to FIG. 1, and thus, further detailed description will be omitted here.

In operation 620, the vertex grouping unit 120 may group vertices into a plurality of vertex groups according to a predetermined method. In this example, when a vertex to be added exceeds a first threshold, a single vertex group may be divided into at least two vertex groups, which is described above with reference to FIG. 1 and FIG. 5.

In operation 630, the prediction mode determination unit 130 may determine a vertex position prediction mode to be applied to the all of the vertices belonging to a corresponding group, with respect to each division group.

Determining the prediction mode may be understood as selecting the prediction mode capable of minimizing a curvature based energy or a mean square error. The 2-ring prediction method and the MMSE prediction method are described as only examples herein, and thus, the present disclosure is not limited thereto or restricted thereby.

In operation 640, the coder 140 may perform entropy coding of a prediction error vector and an index with respect to a prediction mode applied to vertices of each division group, based on a prediction mode to be applied to each division group.

Even though not illustrated in figures, the coder 140 may include an arithmetic coder to perform entropy coding of the index of the vertex position prediction process applied to each division group, and a bit-plane coder to perform entropy coding of the prediction error vector.

In operation 650, coding of connection information may be performed with respect to a decimated vertex. This process may be performed by a conventional entropy coding method for coding connection relationships.

The above data processing method is described above with reference to FIGS. 1 through 5.

The data processing method according to the above-described embodiments may be recorded in non-transitory computer-readable media including program instructions to implement various operations embodied by a computer. The embodiments can be implemented in computing hardware and/or software, such as (in a non-limiting example) any computer that can store, retrieve, process and/or output data and/or communicate with other computers. The results produced can be displayed on a display of the computing hardware. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Moreover, the embodiments of the image processing apparatus may include one or more processors to execute at least one of the above-described units and methods.

Further, according to an aspect of the embodiments, any combinations of the described features, functions and/or operations can be provided.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. A data processing apparatus, comprising:
a vertex grouping unit to group, into at least one group, a plurality of vertices included in a three-dimensional (3D) object;
a prediction mode determination unit to calculate a curvature from other vertices adjacent to a vertex of which a position is desired to be predicted, and to determine a prediction mode for compressing a vertex position with respect to each of the at least one group based on the curvature; and
a coder to code a prediction error vector and an identification (ID) index of the prediction mode determined with respect to each of the at least one group.

2. The data processing apparatus of claim 1, wherein the vertex grouping unit groups, into the at least one group, the plurality of vertices included in the 3D object so that a number of vertices less than or equal to a first threshold are included in a single group.

3. The data processing apparatus of claim 2, wherein the vertex grouping unit determines whether a group is to be divided so that a number of vertices greater than the first threshold are not included in a single group.

4. The data processing apparatus of claim 3, wherein when a number of vertices belonging to a single group exceeds the first threshold according to an addition of a decimated vertex, a single region is divided into two regions.

5. The data processing apparatus of claim 1, further comprising:
a preprocessor to simplify a mesh included in the 3D object by decimating at least a portion from the plurality of vertices included in the 3D object.

6. The data processing apparatus of claim 1, wherein, for a first vertex included in a first group of the at least one group, the prediction mode determination unit determines a prediction mode for predicting a position of the first vertex, based on a curvature that is calculated based on at least one direct connection vertex directly connected to the first vertex, and at least one vertex directly connected to the at least one direct connection vertex.

7. The data processing apparatus of claim 6, wherein, for whole vertices included in the first group, the prediction mode determination unit determines a prediction mode to be applied to the first group so that a prediction error is minimized compared to a data size.

8. The data processing apparatus of claim 7, wherein the prediction mode determination unit determines the prediction mode by applying one of a 2-ring prediction process and a minimum mean square error (MMSE) prediction process.

9. The data processing apparatus of claim 1, wherein the coder comprises:
an arithmetic coder to perform entropy coding of the ID index of the prediction mode determined with respect to each of the at least one group; and
a bit-plane coder to perform entropy coding of the prediction error vector.

10. A data processing method, comprising:
grouping, by a processor, a plurality of vertices included in a three-dimensional (3D) object into at least one group;
calculating a curvature from other vertices adjacent to a vertex of which a position is desired to be predicted;
determining a prediction mode for compressing a vertex position with respect to each of the at least one group based on the curvature; and
coding a prediction error vector and an identification (ID) index of the prediction mode determined with respect to each of the at least one group.

11. The data processing method of claim 10, wherein the grouping comprises grouping, into the at least one group, the plurality of vertices included in the 3D object so that a number of vertices less than or equal to a first threshold are included in a single group.

12. The data processing method of claim 11, wherein the grouping further comprises determining whether a group is to be divided so that a number of vertices greater than the first threshold are not included in a single group.

13. The data processing method of claim 12, wherein when a number of vertices belonging to a single group exceeds the first threshold according to an addition of a decimated vertex, a single region is divided into two regions.

14. The data processing method of claim 10, further comprising:
simplifying a mesh included in the 3D object by decimating at least a portion from the plurality of vertices included in the 3D object.

15. The data processing method of claim 10, wherein the determining comprises determining, for a first vertex included in a first group of the at least one group, a prediction mode for predicting a position of the first vertex, based on a curvature that is calculated based on at least one direct connection vertex directly connected to the first vertex, and at least one vertex directly connected to the at least one direct connection vertex.

16. The data processing method of claim 15, wherein the determining comprises determining, for whole vertices included in the first group, a prediction mode to be applied to the first group so that a prediction error is minimized compared to a data size.

17. The data processing method of claim 16, wherein the determining comprises determining the prediction mode by applying one of a 2-ring prediction process and a minimum mean square error (MMSE) prediction process.

18. The data processing method of claim 10, wherein the coding comprises:
    performing entropy coding of the ID index of the prediction mode determined with respect to each of the at least one group; and
    performing entropy coding of the prediction error vector.

19. A non-transitory computer-readable medium comprising a program for instructing a computer to perform the method of claim 10.

20. A system for processing data representing a three-dimensional (3D) object, the system comprising:
    a preprocessor to simplify the 3D object to be compressed using a mesh simplification process;
    a vertex grouping unit to group a plurality of vertices into one or more groups;
    a prediction mode determination unit to calculate a curvature from other vertices adjacent to a vertex of which a position is desired to be predicted, and to determine a prediction mode most suitable for each of the one or more groups based on the curvature, and to apply the determined prediction mode to each vertex of the plurality of vertices included in a respective group; and
    a coder to code a prediction error vector and an identification (ID) index of the determined prediction mode with respect to each of the one or more groups.

* * * * *